Dec. 27, 1932.  W. BEEHLER  1,892,604
UMBRELLA HOLDER FOR VEHICLES
Filed Jan. 29, 1930  2 Sheets-Sheet 1
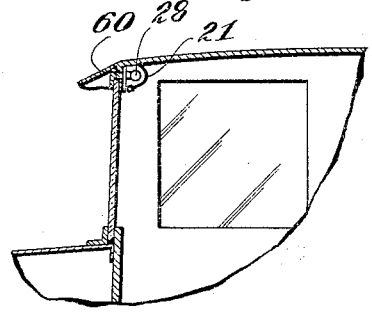
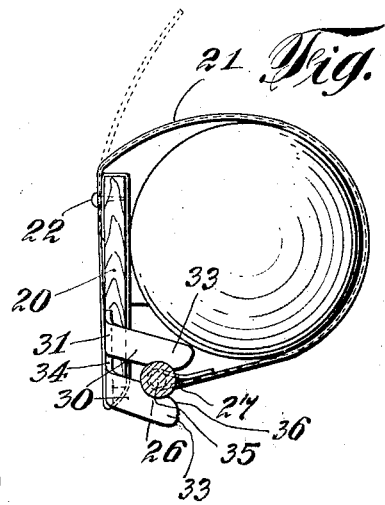
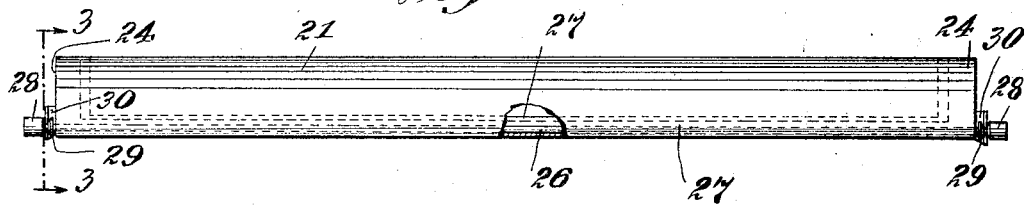
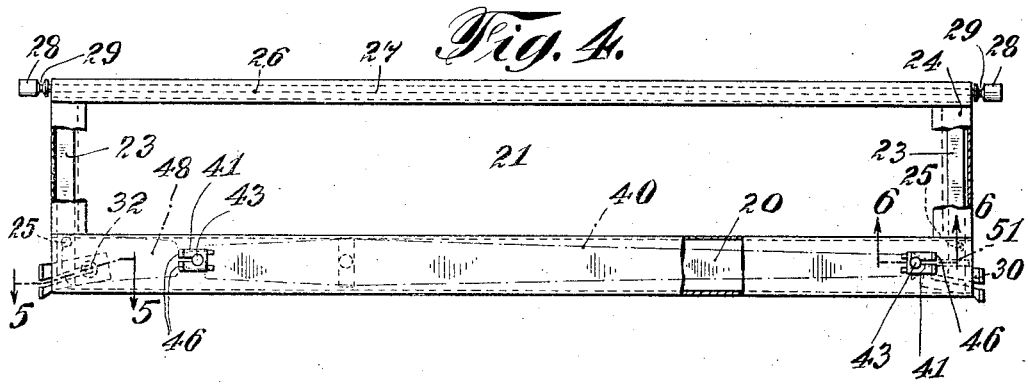
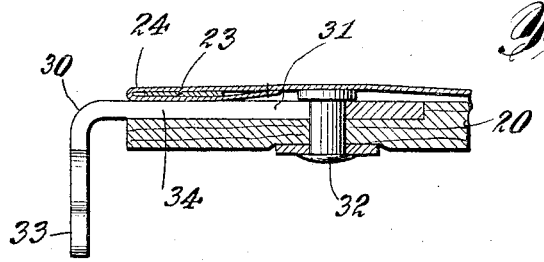
INVENTOR
William Beehler
BY
*his* ATTORNEY Dec. 27, 1932.   W. BEEHLER   1,892,604
UMBRELLA HOLDER FOR VEHICLES
Filed Jan. 29, 1930     2 Sheets-Sheet 2
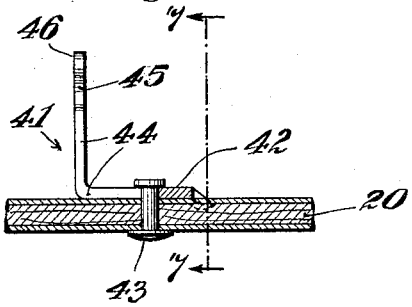
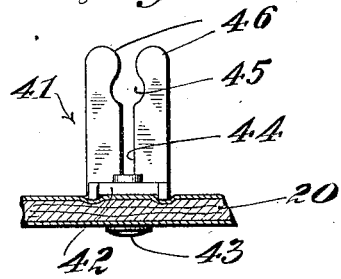
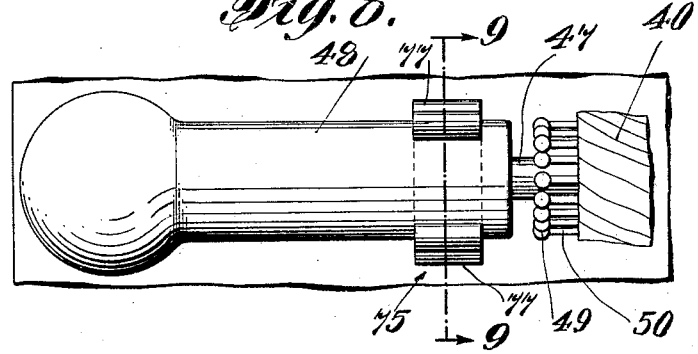
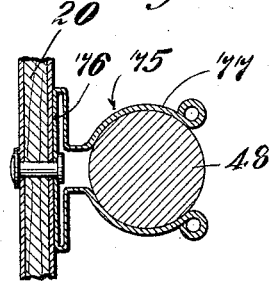
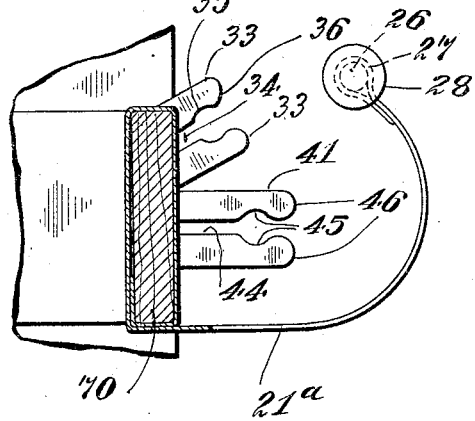
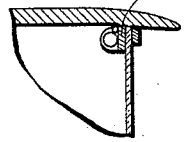
INVENTOR
William Beehler
BY
his ATTORNEY Patented Dec. 27, 1932

1,892,604

UNITED STATES PATENT OFFICE

WILLIAM BEEHLER, OF BALTIMORE, MARYLAND

UMBRELLA HOLDER FOR VEHICLES

Application filed January 29, 1930. Serial No. 424,240.

My invention relates to umbrellas and holders or cases for umbrellas, adapted to be placed, or definitely placed and secured in preferred and advantageous locations in vehicles, especially passenger motor cars.

The principal objects are to provide a case or holder which can be located in a desired position in the vehicle, and especially over the windshield or on the front of a seat riser, where the holder will be out of the way; to provide in the holder supporting means of such character that the umbrella can be easily and quickly inserted and removed; to provide such holding means or clips which will not injure the umbrella and will support it in a position in which there is no possibility of chafing the umbrella cover fabric; to provide a case or cover which preferably entirely encloses the umbrella except at the ends, where the case is open for ventilation; to provide a case of proper material for protection of the umbrella and the vehicle upholstery and which conforms to or is harmonious with the appearance of the upholstery and body design; and to provide a case including a cover portion which is easily and quickly operated, gives a full opening for easy access to the umbrella, and is positively retained in closed position.

Heretofore, the carrying of an umbrella in a motor car has been inconvenient and annoying, since an umbrella loosely placed in a car in any position is liable to fall on the floor, is in the way of passengers while in the car or in entering or leaving, and is subject to injury by being stepped on or by rubbing against parts of the car or other objects. Various holders have been made or proposed, these usually being in the form of boxes of square or tubular section, to be located on or in place of a robe rail or in some cases on a seat riser; but these holders are on account of their box form almost necessarily made of metal; they are unduly large and do not conform or harmonize in material or shape with the interior finish of the vehicle. A satisfactory holder for the present purpose must be of attractive appearance, harmonious with the car finish or upholstery, must fully protect the umbrella and also protect the car and occupants from the umbrella when wet; must be adapted for preferred locations in the vehicle and must be reasonably simple and inexpensive. These requirements are satisfactorily met, and the objects above stated are realized by the cases or holders of preferred forms illustrated in the accompanying drawings. After considering these examples, as described in detail, skilled persons will understand that many variations may be made, and I contemplate the employment of any structures that are within the scope of the appended claims.

Fig. 1 is a vertical, longitudinal section of the front portion of a motor car body with an umbrella and holder embodying the invention in one form located on a frame or body strip over the windshield.

Fig. 2 is a side elevation of the case in closed condition.

Fig. 3 is a section at 3—3, Fig. 2.

Fig. 4 is a front elevation with the case or case cover open.

Fig. 5 is a section at 5—5, Fig. 4, enlarged.

Fig. 6 is a section at 6—6, Fig. 4.

Fig. 7 is a section at 7—7, Fig. 6.

Fig. 8 is an elevation of a modified clip or holding device.

Fig. 9 is a section at 9—9, Fig. 8.

Fig. 10 is a side elevation of a seat, which may be either the front or rear seat of a motor vehicle, with the holder located on the front riser thereof.

Fig. 11 shows a modified construction in which the case or cover material and other devices constituting the holder are applied to a structural part of the motor vehicle, such as a frame or body strip.

Fig. 12 shows the same structure or arrangement in a case located above the windshield.

In the form shown in Figs. 1 to 7, the holder is made as an operative unit, distinct from the structure of the vehicle and adapted for mounting therein in a preferred location, as over the windshield (Fig. 1) or on a seat riser (Fig. 10). The holder includes a base or body 20 which may be a strip of wood of moderate thickness. The case or cover material 21 may be secured to the body strip in various ways. Preferably, the material is wrapped about the body strip to completely enclose it, and secured as by brads 22, which are at the back of the body strip and not visible when the case is in operative position. The portion of the cover material extending from the upper edge of the body strip (in the position of Fig. 1) constitutes a cover to enclose the entire umbrella and also a closure piece or flap which may easily be manipulated to give full access to the interior of the holder and which when in closed position is securely retained in place with its free edge closely and smoothly fitting against the base strip, as will appear.

The cover material may be practically any flexible sheet material which is harmonious with the upholstery of the automobile, such as leather, imitation leather, velour or other fabric; and it may, when desired, be of substantially water-proof material or may include a sheet of water-proof material such as rubberized fabric. For the sake of simplicity, the cover material is illustrated as consisting of a single sheet.

In a preferred construction, the end edges of the cover, or especially the closure portion, are supported and re-enforced by thin strips 23 of spring metal located within hems 24 at the ends of the cover, so that the springs are entirely concealed. One end of each spring is secured to the base strip, as by nailing at 25, Fig. 4. In some cases, these spring strips may be normally nearly straight or flat so that they tend to hold the closure flap in open position. As a variation, they may be normally curved and in such case will tend to retain or move the closure flap to closed position. To retain the free edge of the closure strip in smooth condition and cause it to lie close against the base strip when closed, and also to assist in the manipulation of the closure flap, preferably in some cases a metal rod 26 is inserted in a hem 27 at the free edge of the cover flap. When both the end springs and rod are provided, the free ends of the springs are preferably connected to the rod near its ends, as by forming the spring ends with loops 27 surrounding the rod (Figs. 3 and 11). Either the springs or the rod may be omitted in some cases.

Fastening means for the cover flap are provided, preferably in connection with the springs or rod. Thus when the rod is used, its ends projecting beyond the cover material are provided with latch nobs 28 secured by press fit, or by threading and screwing them upon the rod. At their inward ends, the knobs have annular notches 29 to cooperate with closure spring clips 30. These closure clips consist of pieces of flat spring metal of substantial thickness, including base portions 31 secured to the base strip. Specifically, as shown, the bases of the clips are placed against the back of the base strip and secured by rivets 32. The base portions of the clips are as shown located in channels or mortises in the back of the base strip, but this is not essential. Each clip also includes spring arms or jaws 33 produced by slotting the strip as at 34. The arms are bent at a right angle to the base portion of the clip and the slot extends through the portions 33 and through the bend or angle and for a substantial distance through the base portion of the clip, thus providing ample flexibility or spring action of the clip arms or jaws. Near the ends, the inner faces of the jaws are provided with rounded notches 35 and the ends of the jaws are rounded off at 36 so that the cover flap may easily be secured in the clips by engaging the annular channels 29 of the closure knobs with the jaws and pressing them inward whereupon the notches snap into engagement with the jaws and the cover is thereupon held firmly in closed position with its free edge resting snugly against the base strip substantially at the bottom thereof. The cover may easily be released by pulling the knobs outward, and thereupon if the springs 23 are normally approximately straight or flat, the cover will spring to partially or fully open position, Fig. 4. When closed, the rod 26 keeps the cover edge straight and smooth, which is impracticable with a plurality of spaced snap fasteners, and avoids the expense of insertion of such snap fasteners or other devices, and also the difficulty encountered in attempting to properly space or locate such snap fasteners on the cover and base respective, as well as the annoyance of manipulating a number of such snap devices. The present closure is operated by simple pushing or pulling of the two knobs into or out of the clips.

On the base strip are suitable devices for retaining the umbrella 40 detachably in position. As shown, these devices consist of spring clips 41 which may be substantially similar to the closure clips 31, except that as shown the base portions 42 are shorter. They are secured to the outer face of the base strip 20 as by rivets 43. The slots 44 in the umbrella clips extend through a part of the base and through the angularly bent portion of the clip as in the case of the closure clips and provide ample flexibility or spring action. The notches 45 in the inner edges of the clip jaws 46 near the ends thereof are dimensioned to fit the umbrella rod 47. The umbrella clips are so positioned on the base strip that when the umbrella is put in place as shown in Fig. 4, one of the clips engages the rod between the end of the handle 48 and the tips 49 of ribs 50; and for use with such a clip these rib tips are spaced somewhat away from the end of the handle, substantially as shown in Fig. 8. The other clip is positioned to engage the umbrella rod tip; and in order to provide an umbrella of substantial size, which will still be completely enclosed in a case of length which can be accommodated in a desired position in the automobile, the umbrella rod tip 51 is preferably made short—much shorter than in standard umbrellas.

When the umbrella is placed in the clips, it is firmly held, secure against accidental displacement, and in such manner that the umbrella cover cannot chafe against any object. When the case closure flap is closed and secured, the umbrella is entirely covered, concealed and enclosed, (except at the ends). Preferably, the case ends are open to permit ventilation, or circulation of air so that the umbrella will quickly dry when put away wet and with a minimum risk of mildewing. Passengers and their clothing are entirely protected from injury or inconvenience by contact with the umbrella.

The complete holder may be secured by screws or bolts in a desired location such as to a transverse vertical portion 60 of the automobile body or body frame, above the windshield, Fig. 1, or to the front or riser of the seat as in Fig. 10. In either location, the holder may be positioned so that in opening it, the closure flap will move either up or down. Thus, in Fig. 1, the holder is placed so that the free edge of the closure flap when closed is downward; otherwise it may be arranged with this edge of the flap upward as in Figs. 10 or 12. When the closure flap is moved upward to close it, there is provided an unbroken stretch of cover material at the bottom and below the umbrella, which prevents any leakage when the case is of waterproof material. Otherwise, when the flap closes downward, although the edge of the flap lies close to the base strip, there is at this point a slight crevice which will permit drainage of water if the umbrella is very wet; and in either case, there is some ventilation afforded by a slight crack or crevice usually existing between the free edge of the flap and the base strip.

Figs. 11 and 12 show modifications in which the case is made as a practically integral part of the car body. Thus, in Fig. 11, the case material instead of being applied to an independent base strip as in Figs. 1 to 7, is applied to a strip 70 which in this instance is a front piece or board forming a part of the seat structure, or a riser of the seat. The holder cover material 21ª may be wrapped about the strip 70 or otherwise secured to it and the closure and umbrella holding clips are also secured to the strip, substantially as in the case of the separate base strip.

Fig. 12 shows that the cover material may be applied to a strip or bar 71 which is a transverse frame or body strip at the top of the body at or near the windshield.

Figs. 8 and 9 show a modification in which a different type of clip 75 is provided for the handle end of the umbrella. This clip is made of a strip of spring metal bent to provide a base 76 and socket portions 77 dimensioned to engage the umbrella handle 48. A clip of the type shown in Figs. 6 and 7 may be provided for the rod tip end.

The spring strips at the ends of the cover maintain the cover ends in open loop form. The rod also keeps the cover edge straight and smooth, and the springs and rod together tend to keep the entire cover in approximately smoothly stretched condition, permitting however a certain amount of bending of the cover material so that it does not present a stiff, inflexible appearance similar to that of a metal box, but on the contrary appears and is actually substantially soft and flexible, in conformity with the character of the upholstered surfaces of the car body. In other words, the entire case when closed is conformable in appearance and style to the finish of the car interior and is an attractive accessory or fitting, even in expensively upholstered vehicles while at the same time, the holder is of such simple construction that it can be made at a cost appropriate to automobiles of low price ranges.

In some cases, the edge supporting or re-enforcing rod 26 may be omitted, and in such instances the cooperating closure fastening devices at ends of the closure flap and base respectively may be arranged to properly tension and stretch the free edge of the flap when in closed position, preventing bulging or gaping of the edge.

In some cases, also, additional spring strips such as 23 may be placed in intermediate positions between the ends of the closure flap to additionally support and maintain the cover material in smooth condition. In most cases, the cover material will consist of or include a woven fabric, and in fabrics available for the present purpose, the weave is such that it is practically free from stretching when pulled in the direction of the warp, but stretches materially when pulled in the direction of the woof. The fabric covers are therefore cut so that the warp runs lengthwise of the case, preventing longitudinal stretching, and the re-enforcing springs and edge rod, or both of them, take up the transverse strain and prevent stretching of the material transversely or in the direction of the woof. If the fabric is not arranged in this way, objectionable stretching will occur even when supported or re-enforced by spring strips or edge rod, or both.

In some cases, holding clips 41 or equivalent devices for definitely supporting the umbrella within the case may be omitted, and in such instances, the closure flap may be so shaped and dimensioned as to properly engage and retain the rolled umbrella when the flap is closed. This will permit insertion or removal of the umbrella endwise into either end of the case without necessarily opening the closure flap. When the internal umbrella supporting devices are omitted, the end spring strips 23 and intermediate spring strips which may be provided in addition (as mentioned above), may be of such lengths as to properly conform the closure flap to the umbrella at different points of its length, and these spring strips will also preferably be initially bent, tending to retain the closure flap in closed position and in snug engagement with the umbrella, and preventing the umbrella from falling from the case, if for example, the closure fastenings are accidentally disconnected.

When an edge re-enforcing or supporting rod such as 26 is omitted, additional fastening devices may be placed at the edge of the closure flap and on the base respectively in intermediate lengthwise positions, to retain the edge of the flap in straight form and close engagement with the base. Such additional fastening devices on the cover flap may be associated with or connected to ends of the intermediate spring strips, when such strips are provided.

I claim:—

1. An umbrella case or holder comprising a base, means thereon for detachably supporting an umbrella, a cover of flexible sheet material secured to the base and adapted to enclose and conceal an umbrella supported on the base and means for detachably securing the free edge of the cover in closed position against the base.

2. An umbrella case or holder comprising a base, spring clips on the base adapted to detachably engage portions of an umbrella, a cover of flexible sheet material secured to the base and adapted to enclose and conceal an umbrella supported on the base and means for detachably securing the free edge of the cover in closed position against the base.

3. An umbrella case or holder comprising a base, means thereon for detachably supporting an umbrella, a cover of flexible sheet material secured to the base and adapted to enclose and conceal an umbrella supported on the base, and quickly operable fasteners at opposite ends of the base and free edge of the cover respectively for detachably securing the cover in closed position.

4. An umbrella case or holder comprising a base, means thereon for detachably supporting an umbrella, a cover of flexible sheet material secured to the base and adapted to enclose and conceal an umbrella supported on the base and means for detachably securing the free edge of the cover in closed position against the base, and flat spring strips at end edges of the cover and tending to definitely support the cover ends in open loop form.

5. An umbrella case or holder comprising a base, means thereon for detachably supporting an umbrella, a cover of flexible sheet material secured to the base and adapted to enclose and conceal an umbrella supported on the base and means for detachably securing the free edge of the cover in closed position against the base, and a rod secured at the free edge of the cover.

6. An umbrella case or holder comprising a base, means thereon for detachably supporting an umbrella, a cover of flexible sheet material secured to the base and adapted to enclose and conceal an umbrella supported on the base and means for detachably securing the free edge of the cover in closed position against the base, and flat spring strips at end edges of the cover and tending to definitely support the cover ends in open loop form, and a stiffening and supporting rod at the free edge of the cover.

7. An umbrella case or holder comprising a base, means thereon for detachably supporting an umbrella, a cover of flexible sheet material secured to the base and adapted to enclose and conceal an umbrella supported on the base and means for detachably securing the free edge of the cover in closed position against the base, and flat spring strips at end edges of the cover and tending to definitely support the cover ends in open loop form, and a stiffening and supporting rod at the free edge of the cover, each spring having one end connected to the base, and the rod being connected near its ends to the other ends of the springs.

8. An umbrella case or holder comprising a base, means thereon for detachably supporting an umbrella, a cover of flexible sheet material secured to the base and adapted to enclose and conceal an umbrella supported on the base, closure spring clips on the base near its ends, and cooperating fastening devices at the free edge of the cover at the ends thereof.

9. An umbrella case or holder comprising a base, means thereon for detachably supporting an umbrella, a cover of flexible sheet material secured to the base and adapted to enclose and conceal an umbrella supported on the base, closure clips on the base at the ends thereof, a rod secured along the free edge of the cover, and closure fasteners on the rod ends to cooperate with the closure clips.

10. An umbrella case or holder comprising a base, means thereon for detachably supporting an umbrella, a cover of flexible sheet material secured to the base and adapted to enclose and conceal an umbrella supported on the base, closure spring clips on the base near its ends, spring strips located along the end edges of the cover and each having one end connected to the base, a rod secured along the free edge of the cover and connected near its ends to the free ends of the springs, and closure fastening devices on the ends of the rod to cooperate with the closure clips.

11. An umbrella case or holder comprising a base, means thereon for detachably supporting an umbrella, a cover of flexible sheet material secured to the base and adapted to enclose and conceal an umbrella supported on the base, a rod located along the free edge of the cover, slotted jaw spring clips at the ends of the base, and closure members on the ends of the rod having annular channels to cooperate with the clip jaws.

12. An umbrella case or holder comprising a base, means thereon for detachably supporting an umbrella, a cover of flexible sheet material secured to the base and adapted to enclose and conceal an umbrella supported on the base, a rod located along the free edge of the cover, slotted jaw spring clips at the ends of the base, and grips on the ends of the rod having annular channels to cooperate with the clip jaws, the spring clip jaws being bent angularly and the slots extending through the angle portions to provide ample spring action.

13. An umbrella holder for purposes set forth, comprising a supporting base and a closure flap of flexible sheet material dimensioned to enclose and retain an umbrella, the closure flap having a plurality of transversely arranged support and re-enforcing strips of spring material.

14. An umbrella holder for purposes set forth, comprising a supporting base and a closure flap of flexible sheet material dimensioned to enclose and retain an umbrella, the closure flap having at its end edges re-enforcing and supporting strips of spring material maintaining the ends of the closure in substantially loop form when closed.

15. An umbrella holder for purposes set forth, comprising a supporting base and a closure flap of flexible sheet material dimensioned to enclose and retain an umbrella, the closure flap having a plurality of transversely arranged supporting and re-enforcing strips of spring material, the spring strips being initially bowed and tending to retain the closure flap in closed position and in engagement with the umbrella.

16. An umbrella holder for purposes set forth, comprising a supporting base and a closure flap of flexible sheet material dimensioned to enclose and retain an umbrella, the closure flap having at its free edge a substantially stiff re-enforcing member.

17. An umbrella holder for purposes set forth, comprising a closure flap of flexible sheet material having at its free edge a substantially stiff re-enforcing strip, the said re-enforcing strip having near its ends closure fastening devices, and means at the other edge of the closure flap cooperating with the strip to support and enclose an umbrella.

18. An umbrella case or holder comprising a base having spring clip means mounted thereon, a cover of flexible sheet material secured to the base, a rod carried by the free edge of the cover, said spring clip means serving to detachably support the umbrella on the base and to cooperate with the rod and cover to enclose and conceal the umbrella.

19. An umbrella holder for purposes set forth, comprising a closure flap of flexible sheet material having locking and stiffening means at one edge and projecting beyond the ends thereof, and means at the other edge of the flap cooperating with the locking and stiffening means to support and enclose an umbrella.

WILLIAM BEEHLER.